(12) United States Patent
Gil

(10) Patent No.: US 9,581,443 B2
(45) Date of Patent: Feb. 28, 2017

(54) SURVEYING SYSTEM

(71) Applicant: Ronald D. Shaw, Costa Mesa, CA (US)

(72) Inventor: Jesse Gil, La Mirada, CA (US)

(*) Notice: Subject to any disclaimer, the term of this patent is extended or adjusted under 35 U.S.C. 154(b) by 0 days.

(21) Appl. No.: 14/660,672

(22) Filed: Mar. 17, 2015

(65) Prior Publication Data
US 2015/0261217 A1     Sep. 17, 2015

Related U.S. Application Data

(60) Provisional application No. 61/954,148, filed on Mar. 17, 2014.

(51) Int. Cl.
| G01C 15/04 | (2006.01) |
| G05D 1/00 | (2006.01) |
| G05D 1/10 | (2006.01) |
| B05B 13/00 | (2006.01) |

(52) U.S. Cl.
CPC ........... *G01C 15/04* (2013.01); *G05D 1/0038* (2013.01); *G05D 1/0094* (2013.01); *G05D 1/102* (2013.01); *B05B 13/005* (2013.01)

(58) Field of Classification Search
CPC .............................. G01C 15/04; G05D 1/0038
See application file for complete search history.

(56) References Cited

U.S. PATENT DOCUMENTS

| 4,727,374 A | 2/1988 | Boulais |
| 6,094,625 A | 7/2000 | Ralston |
| 6,825,793 B2 | 11/2004 | Taylor |
| 7,737,965 B2 | 6/2010 | Alter |
| 8,060,344 B2 | 11/2011 | Stathis |
| 2007/0052951 A1 | 3/2007 | Van Cranenbroeck |
| 2011/0000095 A1 | 1/2011 | Carlson |
| 2011/0043515 A1 | 2/2011 | Stathis |
| 2012/0029870 A1 | 2/2012 | Stathis |
| 2013/0096873 A1 | 4/2013 | Rosengaus |
| 2013/0138606 A1 | 5/2013 | Kahle |
| 2013/0245946 A1 | 9/2013 | Carlson |
| 2014/0125651 A1 | 5/2014 | Sharp et al. |
| 2014/0163772 A1* | 6/2014 | Vian .................... G05D 1/0094 701/2 |
| 2014/0163775 A1 | 6/2014 | Metzler |
| 2014/0210663 A1 | 7/2014 | Metzler |

OTHER PUBLICATIONS

International Search Report and Written Opinion for International Application No. PCT/US15/43323; Oct. 20, 2015; 9 pages.

* cited by examiner

*Primary Examiner* — Basil T Jos
(74) *Attorney, Agent, or Firm* — Stetina Brunda Garred & Brucker

(57) ABSTRACT

A surveying system having a total station integrated into an unmanned aerial vehicle communicates with a plurality of mobile communication stations that are located on known site coordinates. By locating the mobile communication stations on known coordinates, the location of the aerial vehicle is precisely triangulated and controlled. Construction drawings are loaded into the system, thereby allowing the vehicle to locate itself at specific points designated in the drawings for the marking of on-site construction grid lines.

17 Claims, 4 Drawing Sheets

SURVEYING SYSTEM

CROSS-REFERENCE TO RELATED APPLICATIONS

This application relates to and claims the benefit of U.S. Provisional Application No. 61/954,148 filed Mar. 19, 2014 and entitled "SURVEYING SYSTEM," the disclosure of which is wholly incorporated by reference in its entirety herein.

STATEMENT RE: FEDERALLY SPONSORED RESEARCH/DEVELOPMENT

Not Applicable

BACKGROUND

1. Technical Field

The present invention relates to a surveying system. In particular, the invention relates to a surveying system having an unmanned aerial vehicle capable of establishing construction gridlines at the construction site from the construction drawings.

2. Related Art

Surveying is the technique of accurately determining the three-dimensional position of points and the distances and angles between them, utilizing in part geometry and trigonometry. In surveying, various kinds of surveying instruments, such as theodolites or total stations, are commonly used for measuring distances and/or angles of objects. Conventionally, these surveying instruments are mounted on a stand to stably position the surveying instrument on the ground and have a head that may be moved with respected to the stand. The head generally includes an optical device, such as a ranging or sighting device for focusing on an object.

Typically, construction drawings are made up of a site layout plan and a floor plan, which will contain gridlines for the desired dimensions of the construction. In order to establish the gridlines at the construction site, a surveying team will take a government land survey plan featuring true coordinate control points, will establish control points at the construction site, and will then proceed to set out the gridlines at the construction site. This is typically achieved by one surveyor manning a total station at a known given point and at least one additional surveyor manning a target and physically moving the target into sight of the total station at set locations to establish the gridlines. This method, however, can be cumbersome in that it requires a team of skilled surveyors to man the total station and the targets to physically mark the control lines.

Improvements to this method are known in the art, for example, total stations now allow for the construction drawings to be loaded directly into the total station, thereby having the points and elevations contained within the system to speed up and simplify the process of targeting the specific points. However, even with this improvement a team of surveyors is still needed to man the total station and to physically move the target around the construction site.

Further improvements known in the art include remotely controlled total stations, wherein a single surveyor may remotely operate the total station while moving the target from location to location and viewing the sight of the total station via a remote viewing device. However, this still requires a skilled surveyor to operate the total station and move the target from point to point.

As such, there is a need for an improved surveying system that allows for the establishment of site construction gridlines in an easy manner without the need for a team of skilled surveyors.

BRIEF SUMMARY

One embodiment of the present disclosure is a surveying system having a total station integrated into an unmanned aerial vehicle that communicates with a plurality of mobile communication stations that are located on known site coordinates. By locating the mobile communication stations on known coordinates, the location of the aerial vehicle can be precisely triangulated and controlled. Further, construction drawings may be loaded into the system, thereby allowing the vehicle to locate itself at specific points designated in the drawings for the marking of on-site construction grid lines.

In particular, the unmanned aerial vehicle may be a multi-rotator aircraft. Preferably, the aircraft may be a quadcopter. The vehicle may have total station components integrated into its design. For example, the vehicle may include a camera, a laser marker, and/or a sonar component. Additionally, the vehicle will have an antenna and controller components for interacting with the communication stations and for moving from location to location at the site.

The mobile communication stations may communicate with each other and/or the vehicle via known methods in the art, such as infrared or radio frequency. The communication stations may further include GPS units to allow for precise location data at the installation site. Alternatively, the communication stations may be placed at known coordinates.

The survey system may further include a controlling unit. The controlling unit may be a dedicated device, or it may be software installed on a conventional tablet or other mobile computing device. The controlling unit allows for a user of the system to control the location of the vehicle and/or to see the data/video image being captured by the vehicle.

The survey system may further include a charging station. The vehicle unit is capable of docking with the charging station to recharge batteries contained within the vehicle for powering the vehicle and the survey devices contained within the vehicle. Additionally, the vehicle unit may monitor its own battery charge and distance from the charging station. As such, the vehicle unit may return itself to the charging station when the battery charge reaches a predetermined limit, so as to not cause damage to the vehicle unit or retrieval issues, should the vehicle run out of battery life at an inopportune time.

By loading the construction drawings into the system and triangulating the location of the vehicle unit in relation to the communication stations, the vehicle unit may locate itself at predetermined positions per the construction drawings to allow for the establishment of construction gridlines on site. In particular, a laser marker of the vehicle may mark specific coordinates and elevations, which can then be marked on site by users of the system. Another aspect of the system is that via the use of a sonar device (or other imaging components, including but not limited to a camera), the system may be used to map the surface of objects to create a 3D image of the site. This aspect can be particularly useful for conducting as-built surveys after the completion of the construction project.

Another embodiment of the surveying system includes a ground vehicle unit. The ground vehicle unit may be in communication with the communication stations and/or the aerial vehicle. In particular, the aerial vehicle and ground vehicle unit may be configured such that the aerial vehicle dock on the top of the ground vehicle unit. The ground vehicle unit may include a wheel system and/or a track system to allow the ground vehicle to move to specific coordinates. The ground vehicle unit may further include various marking means to mark XYZ coordinates at specific locations. The ground vehicle unit may have various components to both read whether the unit is level and/or plumb and to adjust the unit to a level and/or plumb position before marking XYZ coordinates.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The detailed description set forth below is intended as a description of the presently preferred embodiment of the invention, and is not intended to represent the only form in which the present invention may be constructed or utilized. The description sets forth the functions and sequences of steps for constructing and operating the invention. It is to be understood, however, that the same or equivalent functions and sequences may be accomplished by different embodiments and that they are also intended to be encompassed within the scope of the invention.

Figure 1:
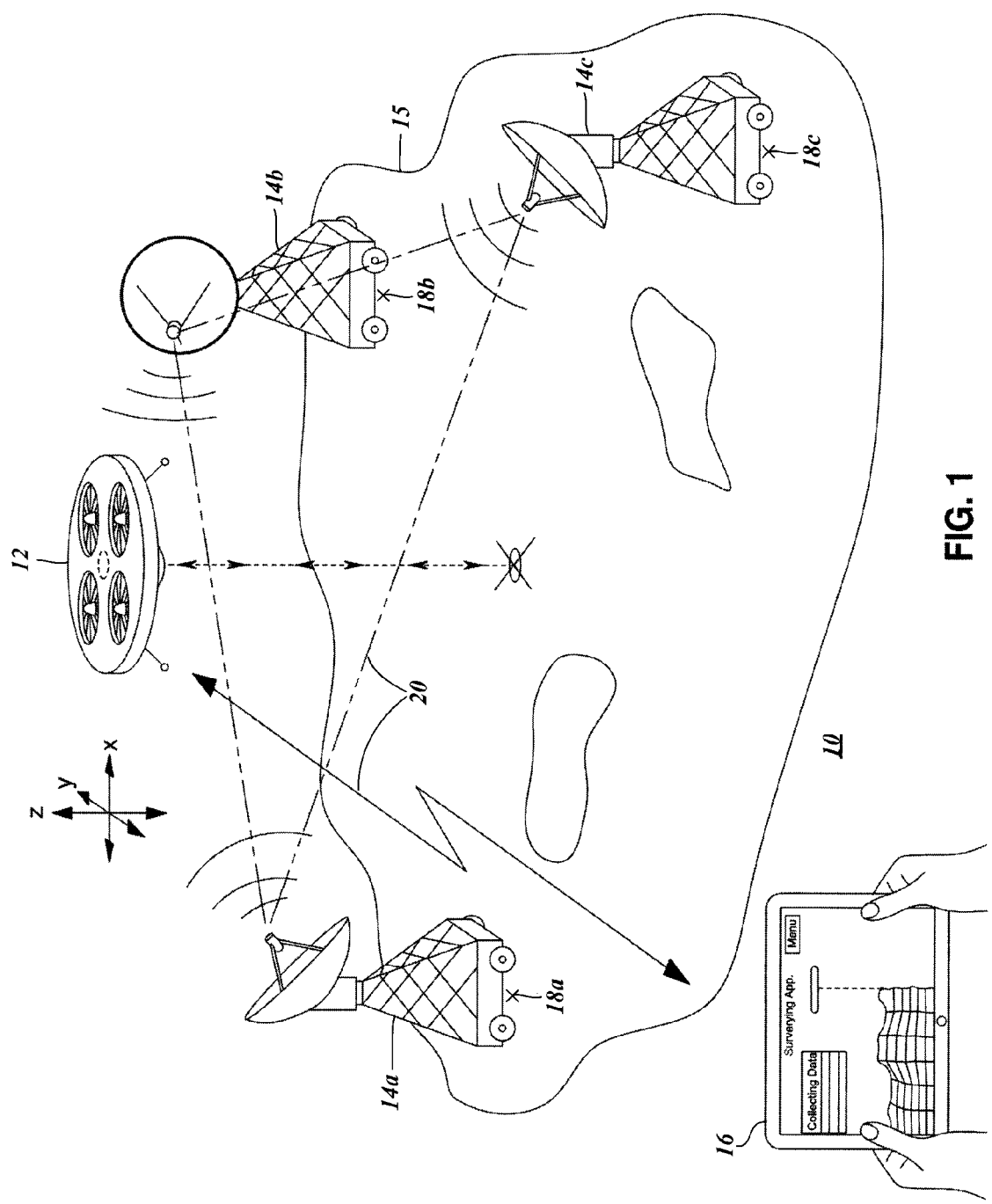
FIG. 1 is a diagram illustrating the various components of a surveying system in accordance with the present disclosure.

As shown in FIG. 1, a surveying system 10 of the present disclosure includes a vehicle unit 12, a plurality of mobile communication stations 14, and a controller unit 16. In order to utilize the surveying system 10, a plurality of the mobile communication stations 14 are located on a survey site 15 at specific coordinates 18. More particularly, there is a first mobile communication station 14a positioned at a first location 18a, a second mobile communication station 18b positioned at a second location 18b distant from the first location 18a, and a third mobile communication station 18c positioned at a third location 18c distant from both the first location 18a and the second location 18b. The communication station locations 18 may be identified by previously known landmarks or coordinates, via conventional surveying methods, or via the use of GPS coordinates. In particular, the mobile communication stations 14 may each have onboard GPS devices to allow for their precise location determination that can then be relayed to the other modules of the surveying system 10. The mobile communication stations 14 are configured to communicate with (and transmit/receive data to and from) each other, the vehicle unit 12, and the controller unit 16 over a wireless network 20. This communication may be achieved by conventional wireless communications modalities such as infrared or radio frequency, and each of the components that participate in the wireless network 20 are understood to incorporate appropriate electronic components therefor, including transceivers, modulators/demodulators, antennas, and so forth.

Figure 2:
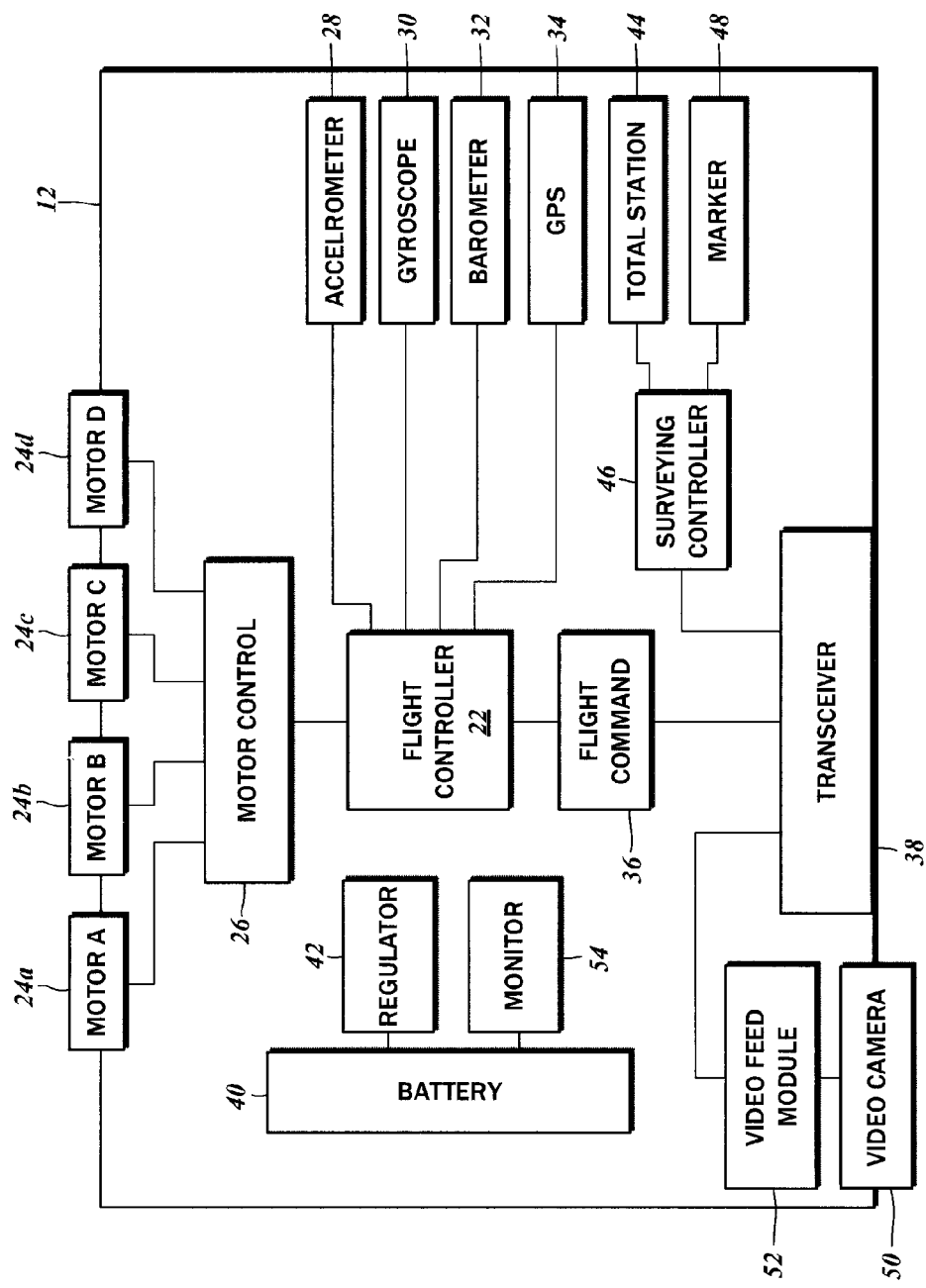
FIG. 2 is a block diagram of the components of an aerial vehicle unit of the surveying system.

The vehicle unit 12 may take the form of a quadcopter unmanned aerial vehicle. The use of a quadcopter allows for easy control of the vehicle, and excellent stability when in location for marking. Quadcopters may allow for stability and precise location within ⅛" in any direction. The vehicle unit 12 includes various control components to allow for precise movement and hovering abilities around the survey site 15. With reference to the block diagram of FIG. 2, an exemplary implementation of the vehicle unit 12 may include a flight controller 22 that is a general purpose microcontroller with a data processor that can execute pre-programmed instructions, memory to store those instructions and other data, and multiple input/output ports. The quadcopter, as suggested by its namesake, is understood to utilize four propellers that provide lift and movement along six degree of freedom. Each of the propellers is rotated by a separate motor 24a-d, and depending on how each of these motors 24 is driven in combination, the body of the vehicle unit 12 may be moved in different ways. The specific rotation speeds of the individual motors 24 may be governed by a motor control circuit 26 that outputs different electrical voltage levels to the motor 24 for different speeds.

More generalized control outputs are generated from the flight controller 22 to the motor control circuit 26. The degree of abstraction from the motor control circuit 26 to the flight controller 22 may vary depending on the implementation, but at the very least, electrical circuits generating the higher current and voltages required to drive the motors 24 are understood to be isolated from the flight controller 22. Continuously, and on a real-time basis, the flight controller 22 generates outputs to the motor control circuit 24 to regulate the flight of the vehicle unit 12. In order to maintain a steady state flight, the flight controller 22 responds to multiple environmental conditions. The information utilized for such responses is generated by different sensors, including an accelerometer 28, a gyroscope 30, and a barometer 32, among others, which are all connected to the flight controller 22. The accelerometer 28 and the gyroscope 30 are understood to have individual sensors for each of x, y, and z axes, though a composite output that combines data for all three axes may be generated. In addition to the aforementioned sensors that are utilized to compute flight dynamics, the specific location of the vehicle unit 12 may be detected with a Global Positioning System (GPS) satellite receiver 34, which is also connected to the flight controller 22.

A user may direct, or the vehicle unit 12 may be autonomously directed to various locations within the survey site 15. Where a user directs the navigation of the vehicle unit 12, it may be done so via the controller unit 16. In one embodiment, the controller unit 16 is a dedicated device for controlling and interacting with the other components of the surveying system 10. Alternatively, it may be a software application that is installed on a conventional mobile computing device, such as a tablet computer.

Vehicle guidance may be provided via a flight command module 36 that outputs commands or instructions to the flight controller 22 (such as rotate left, pitch up, increase altitude, and so forth). The flight command module 36 may be connected to a transceiver circuit 38 that receives a control signal generated by the controller unit 16 or other signal source, and converts the same to the commands or instructions that are executed by the flight controller 22. It will be appreciated by those having ordinary skill in the art that feedback data provided from the various sensors (accelerometer 28, gyroscope 30, barometer 32) are used to regulate flight dynamics, and hence the output to the motor control circuit 26.

All of the electronic components in the vehicle unit 12 may be powered by a single on-board battery 40. There may additionally be a power regulator circuit 42 that stabilizes the output voltage level to each of the components.

The vehicle unit 12 is understood to include different surveying components, and remote control thereof from the controller unit 16 is contemplated. In one embodiment, a surveying total station 44, that is, an electronic theodolite including a distance meter, may be incorporated, though less than all of the parts of the total station may be utilized. Furthermore, as will be described more fully below, there may also be a marker 48, which can be a laser, sonar, or any other desired modality. Control of the surveying total station 44 and the marker 48 is achieved with a surveying controller 46 that may be independent of the flight controller 22, though remote data transmissions may be received from the same transceiver circuit 38. In some embodiments, the functionality (including data transmission) of the surveying components may be independent of the flight control systems. The surveying controller 46 is understood to parse the various theodolite trunnion and vertical axis movement commands input by the user from the controller unit 16 other source, package the recorded video/image data for transmission to the controller unit 16, and initiate the output from the marker 48 likewise based on received commands therefor.

By locating the mobile communication stations 14 on known coordinates, the location of the vehicle unit 12 can be precisely triangulated. Additionally, construction drawings or site maps may be loaded into the surveying system 10. The surveying system 10 disclosed herein is envisioned as being compatible with and accepting plans or drawings produced by conventional architectural or planning programs. As such, there is access to coordinates necessary for construction. The vehicle unit 12 may then travel to the designated construction coordinates and mark the locations with the marker 48 or laser. This allows for users of the surveying system 10 to then physically locate and/or mark these locations on the site to create construction control lines and/or elevations.

Another embodiment of the surveying system 10 involves the mapping of surfaces of objects at the survey site 15, utilizing components on board the vehicle unit 12. In one variation, this may be a sonar ranging device, though in others, a video camera 50 may be utilized. The video camera 50 may be connected to a video feed module 52 that encodes and the raw video data for transmission to the controller unit 16. The wireless data transfer to the controller unit 16 may utilize the existing transceiver circuit 38 that may be used for flight commands, but a separate independent modality may be substituted without departing from the scope of the present disclosure.

By traversing the site while recording information, the vehicle unit 12 can capture a three-dimensional representation of the survey site 15 for subsequent review and analysis. This can be useful for collecting raw data and for conducting as built surveys at the completion of construction. In particular, by precisely knowing the location of the vehicle unit 12 at all times, as built-surveys conducted using the present system allow not just for producing the three-dimensional representation but also for tying particular 3D images to specific locations. Accordingly, the time-consuming task of producing the three-dimensional representation separate from verifying the measurements and locations via a coordinate grid system. Like the mapping data that can be loaded into the surveying system 10 for directing the vehicle unit 12 to particular locations as designated thereby, the output three-dimensional representation is understood to be compatible with conventional architectural or planning software applications.

The controller unit 16 allows for manual control of the vehicle unit 12 (when needed), entry of coordinates, viewing of imported coordinates, viewing of data received from the vehicle unit 12, including a video feed from any mounted camera device 50. Along those lines, control of the vehicle unit 12 may be achieved through various control modalities, for example, touch screen interactions, physical movements of the controller unit, and/or physical movements of a controller accessory in communication with the controller unit (such as a control wand).

As indicated above, the vehicle unit 12 may be powered by the on-board battery 40 or other energy sources known within the field. The depleted battery may be removable, and swapped for charged batteries as needed or may be configured within the vehicle for recharging in an installed configuration. The surveying system 10 may further include a charging station that the vehicle unit 12 may dock with to recharge batteries located within the vehicle unit 12. In one embodiment, the vehicle unit 12 may have a battery charge monitor 54 that senses the current state of battery charge. This information, combined with the location distance from the charging station. In this embodiment, when the battery charge monitor 54 determines the battery charge levels have reached a predetermined limit based on the distance of the vehicle from the charging station, the vehicle will be self-guided to the charging station to recharge the batteries. By utilizing this aspect, damage to the vehicle can be prevented from running out of charge while the vehicle is in a hovering position. Additionally, the self-returning aspect eliminates the need for a user to recover the vehicle unit 12 from a potentially distant location.

Figure 3:
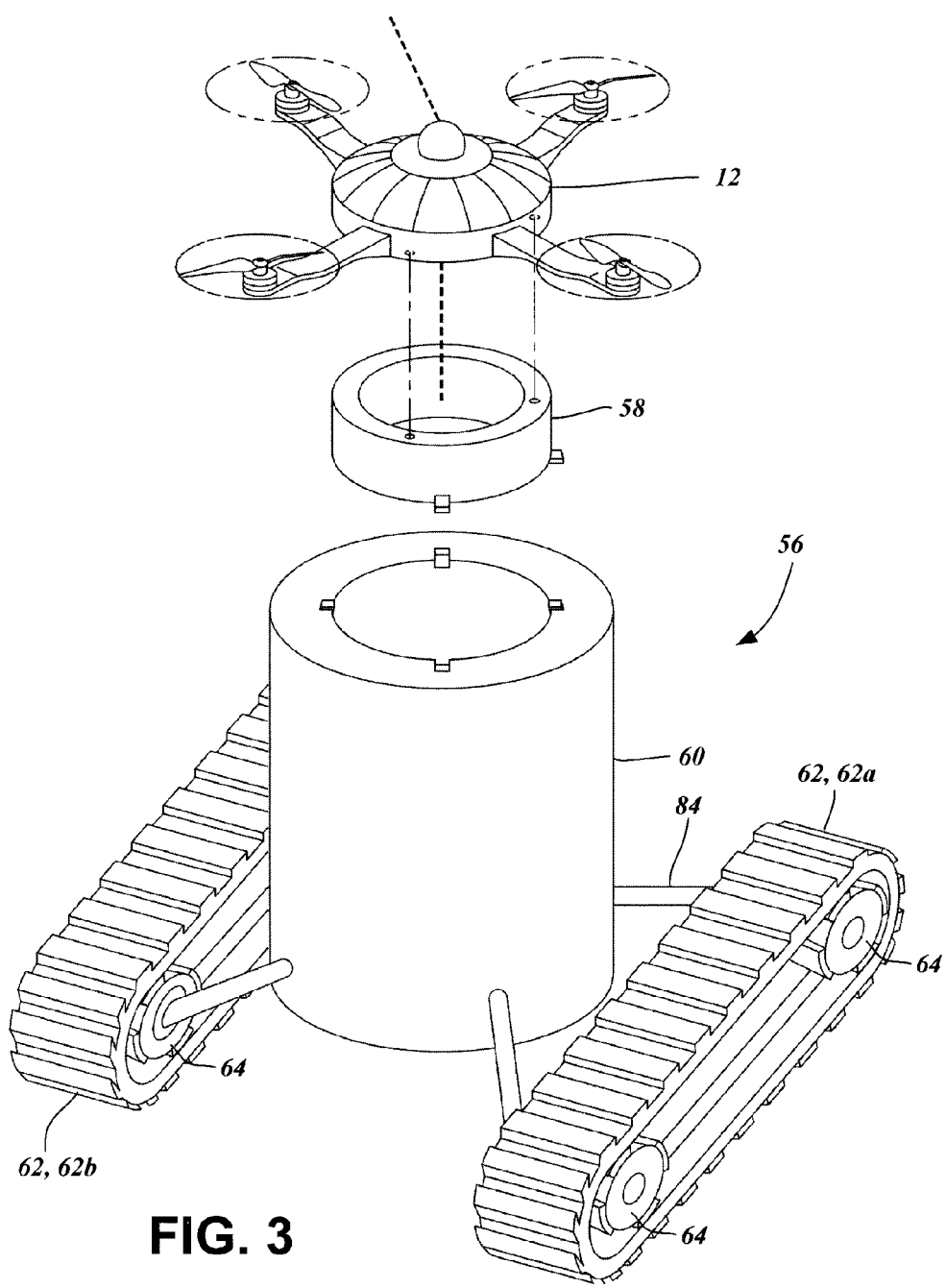
FIG. 3 is a perspective view of a combined ground and aerial vehicle unit of one embodiment of the present disclosure.

With reference to the diagram of FIG. 3, another embodiment of the vehicle unit 12 includes a ground vehicle unit 56. This ground vehicle unit 56 may either replace the aerial vehicle unit 12 described above, or may work cooperatively with the aerial vehicle unit 12. In particular, the ground vehicle unit 56 may be configured such that the aerial vehicle unit 12 can dock with a top portion 58 of the ground vehicle unit 56 for transportation and/or charging purposes.

In further detail, the ground vehicle unit 56 includes an enclosure 60 within which the various components thereof, to be described in further detail below, are housed. The enclosure 60 is movable and rides on a pair of continuous tracks 62a and 62b each driven by a pair of opposed wheels 64. Alternative embodiments contemplate a strictly wheel-based configuration. The ground vehicle units 56 may allow for the interchangeability of wheels and track systems depending on the needs of any given location.

Figure 4:
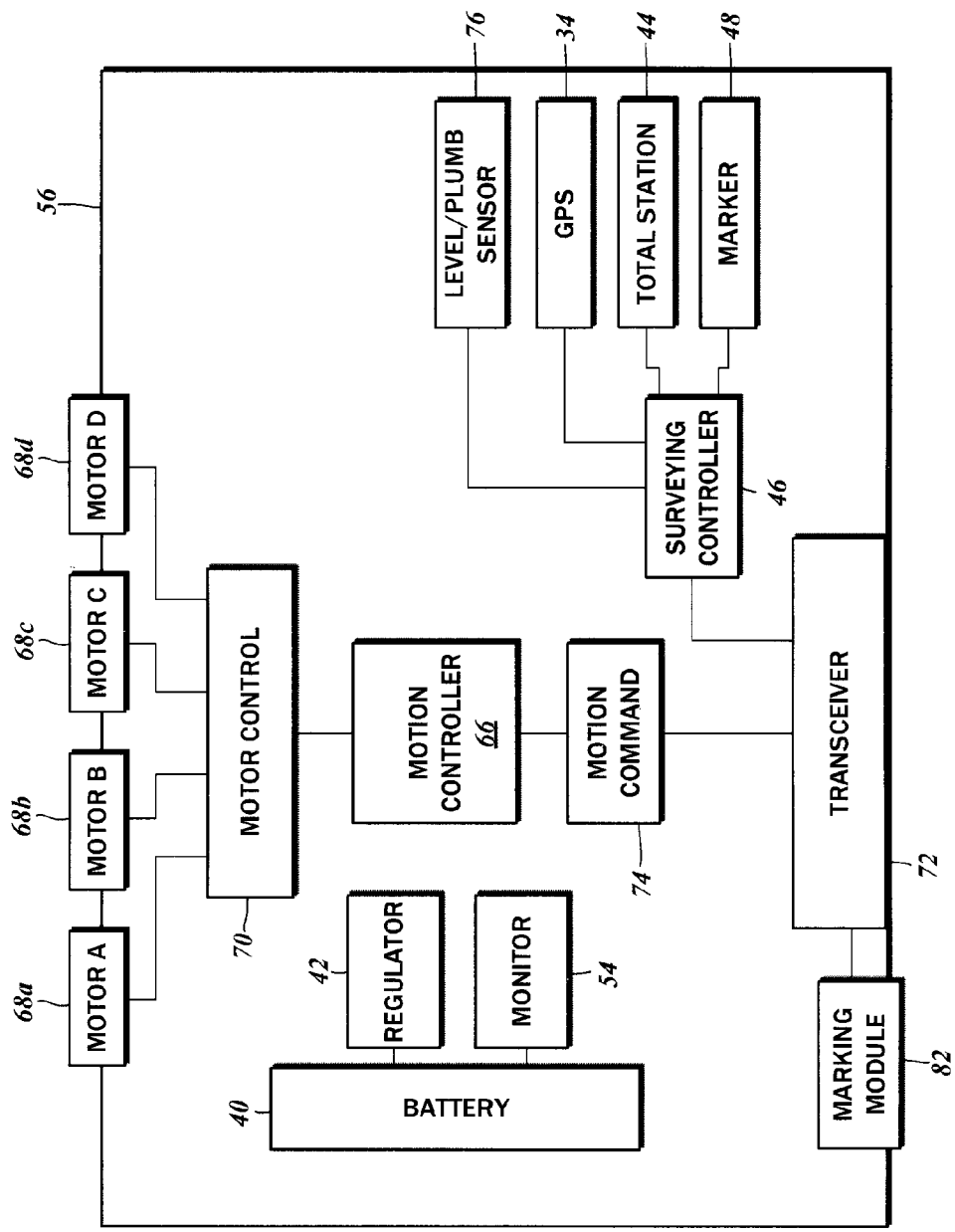
FIG. 4 is a block diagram of the components of a ground vehicle unit of the surveying system.

Referring to the block diagram of FIG. 4, the ground vehicle unit 56 may include the same components discussed above in relation to the aerial vehicle unit 12. In this regard, there may be a central motion controller 66 that governs the movement of the ground vehicle unit 56. This allows for precise movement and location marking abilities around the survey site 15. As noted, the tracks 62 are driven by the rotating wheels 64, which may in turn be driven individually by motors 68a-68d. Again, the motors 68 are operated with a motor control circuit 70 that, in one embodiment, adjusts the voltage levels of the electrical signal applied to the electrical terminals of the motors 68 to initiate movement. Although brushless DC motors were utilized in the aerial vehicle unit 12, due to the substantially reduced rotation requirements and the simultaneous requirements for greater precision, stepper motors may be substituted without departing from the scope of the present disclosure. In such case, the motor control circuit 70 is understood to generate signals corresponding to each fractional rotation step of its rotor.

The ground vehicle unit 56 may include various communication components including a transceiver 72 to communicate with the mobile communication stations 14, the controller unit 16, and/or the aerial vehicle unit 12. The transceiver 72 is understood to receive commands at varying abstraction levels. At its most general level, these commands may include general positioning type instructions where particular coordinates within the survey site 15 are specified, and the ground vehicle unit 56 determines how, exactly, to get to that location, including the avoidance of any obstacles. On a more specific level, movement type instructions can be specified where the ground vehicle unit 56 is directed to turn left, or right, move forward or backwards for a predetermined duration. Furthermore, continuous manual remote control commands that are immediately responsive to user input on the controller unit 16 are also possible. The signals corresponding to these commands may be received via the transceiver 72 and parsed by a motion command module 74. In some cases, the motion command module 74 is integral with the central motion controller 66.

For precise location and marking features, the ground vehicle unit 56 may include leveling and plumbing sensors 76 to determine whether the ground unit is level or plumb at any given time. Further stability to the ground vehicle unit 56 may be imparted with the application of a screw gun 78 or a nail gun 80, which secures the enclosure 60 to a desired service. The leveling and plumbing sensors 76 may work in conjunction with the GPS satellite receiver 34. The ground vehicle unit 56 may include surveying components, and may include the integration of a surveying total station 44 or parts of a total station. The laser marker 48 and/or a sonar module may also be included. The surveying total station 44 and the laser marker 48 may be operated with the surveying controller 46, which may be separate and independent of the movement-related components. It is envisioned that the control software, and ability to import construction plans may be shared by both the aerial and ground vehicles.

The ground vehicle unit 56 may further include at least one marking module 82 for marking precise XYZ coordinates. These marking modules may include, but are not limited to a paint roller, an adjustable stamping apparatus, a spray paint device, a felt pen ink device, a labeling device, and/or a punch device. In particular, the labeling device may further include a label storing station to hold a supply of labels and supply them to the labeling device. The ground vehicle unit 56 may include one or a plurality of these marking components. In one embodiment, there is a single marking orifice within the ground vehicle unit 56 and the plurality of marking components are configured on a track system to move the desired marking module 82 over the marking orifice. Alternatively, there could be a marking orifice located under each marking module 82, wherein each marking module 82 remains in a stationary configuration.

It is envisioned that when the ground vehicle unit 56 is located at the precise XYZ coordinate to be marked, the leveling and plumbing sensors 76 determine whether the unit is level and/or plumb. The ground vehicle unit 56 may include adjustable axles 84 connecting the wheels or track systems. If it is determined that the ground unit is not level or plumb, the ground vehicle unit 56 may adjust the axles 84 in such a fashion as to make the ground unit level and plumb before marking the location.

It is envisioned that the ground vehicle unit 56 may be useful in marking precise locations in both the horizontal and vertical aspects of construction. For example, the ground unit may be useful in marking the location of rebar installation locations in the ground for laying concrete foundations. Additionally, or alternatively, the ground vehicle unit 56 may be useful in marking locations on the frames or walls of construction projects, for example, to mark the location for the installation of plumbing and HVAC hangers and supports.

The above description is given by way of example, and not limitation. Given the above disclosure, one skilled in the art could devise variations that are within the scope and spirit of the invention disclosed herein, including various configurations of the vehicle unit, number of communication stations located on site, methods of communicating between components of the system, and various forms taken by the controller unit. Further, while the disclosure focuses on land surveying techniques, it is to be understood that the system can be utilized to establish geometrical layouts in any field or industry that has a need for its geometrical establishing capabilities. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A surveying system, comprising:
   an aerial vehicle maneuverable within a surveying site;
   a plurality of ground-based mobile communication stations positioned in different locations in the surveying site, each of the plurality of ground-based mobile communication stations being associated with a set of predefined coordinates corresponding to the location at which it is positioned;
   a first wireless transceiver onboard the aerial vehicle and in communication with each of the plurality of ground-based mobile communication stations, a location of the aerial vehicle within the surveying site being determined based upon a triangulation thereof by the plurality of ground-based mobile communication stations from the sets of predefined coordinates associated therewith;
   a surveying total station onboard the aerial vehicle; and
   a navigation unit onboard the aerial vehicle, the navigation unit being loaded with a representation of the surveying site and including one or more points of interest thereon, the navigation unit maneuvering the aerial vehicle to a selected one of the one or more points of interest.

2. The surveying system of claim 1, further comprising:
   a controlling unit including a second wireless transceiver in communication with the first wireless transceiver onboard the aerial vehicle;
   wherein the controlling unit is receptive to navigational control inputs to the aerial vehicle.

3. The surveying system of claim 2, further comprising:
   an image capturing device on board the aerial vehicle;
   wherein the controlling unit is receptive to image data generated by the image capturing device.

4. The surveying system of claim 3, wherein the controlling unit includes a display device on which the image data is displayed.

5. The surveying system of claim 1, further comprising:
a survey site capturing module onboard the aerial vehicle that is receptive of a set of coordinates of a particular location in the surveying site.

6. The surveying system of claim 1, further comprising:
a laser marker onboard the aerial vehicle activatable at the one or more points of interest of the surveying site upon the aerial vehicle being navigated thereto.

7. The surveying system of claim 1, wherein the aerial vehicle is a multi-rotor aircraft.

8. The surveying system of claim 7, wherein the aerial vehicle includes a power level monitor, the aerial vehicle being navigated to the power charging station without user intervention upon a power level of an onboard battery being depleted past a predetermined level.

9. The surveying system of claim 8, wherein the ground vehicle unit includes a second wireless transceiver in communication with at least one or more of the plurality of ground-based mobile communication stations.

10. The surveying system of claim 9, wherein the marker module is selected from a group consisting of: a paint roller module, a stamp module, a spray paint module, a felt pen ink module, an ink stamp module, a punch module, and a label module.

11. The surveying system of claim 8, wherein the ground vehicle unit includes a level and plumb sensor.

12. The surveying system of claim 8, wherein the ground vehicle unit has continuous track-based vehicle propulsion.

13. The surveying system of claim 8, wherein the ground vehicle unit has wheel-based vehicle propulsion.

14. The surveying system of claim 1, further comprising:
a power charging station, the aerial vehicle being dockable thereto.

15. The surveying system of claim 1, further comprising:
a ground vehicle unit maneuverable within the surveying site.

16. The surveying system of claim 15, wherein the ground vehicle unit includes a marker module that outputs a marker when the ground vehicle is positioned at the selected one of the one or more points of interest.

17. The surveying system of claim 1, wherein one or more of the ground-based mobile communication stations includes a Global Positioning System receiver that generates the set of coordinates of the particular location in the surveying site on which the ground-based mobile communication station is positioned.

* * * * *